C. H. CARLETON.
COPY HOLDER.
APPLICATION FILED JULY 31, 1916.

1,214,132.

Patented Jan. 30, 1917.
2 SHEETS—SHEET 1.

C. H. CARLETON
Inventor

Witnesses by C. A. Snow & Co.
Attorneys

C. H. CARLETON.
COPY HOLDER.
APPLICATION FILED JULY 31, 1916.

1,214,132.

Patented Jan. 30, 1917.
2 SHEETS—SHEET 2.

Witnesses

C. H. CARLETON
Inventor by

Attorneys

UNITED STATES PATENT OFFICE.

CHARLES H. CARLETON, OF SAN FRANCISCO, CALIFORNIA, ASSIGNOR OF ONE-HALF TO RENE WHAITE, OF SAN FRANCISCO, CALIFORNIA.

COPY-HOLDER.

1,214,132. Specification of Letters Patent. Patented Jan. 30, 1917.

Application filed July 31, 1916. Serial No. 112,340.

*To all whom it may concern:*

Be it known that I, CHARLES H. CARLETON, a citizen of the United States, residing at San Francisco, in the county of San Francisco and State of California, have invented a new and useful Copy-Holder, of which the following is a specification.

The object of the invention is to provide a simple, inexpensive an efficient apparatus for focusing and exposing, especially as applied to enlarging and reducing cameras, whereby the use of a removable plate or paper holder is eliminated, and the exact and rapid placing of sensitized paper is made possible, with the purpose of increasing the rapidity and accuracy of manipulation.

Further objects of the invention will appear as the description proceeds, it being understood that changes in the precise embodiment of the invention herein disclosed, can be made within the scope of what is claimed, without departing from the spirit of the invention.

Figure 1:
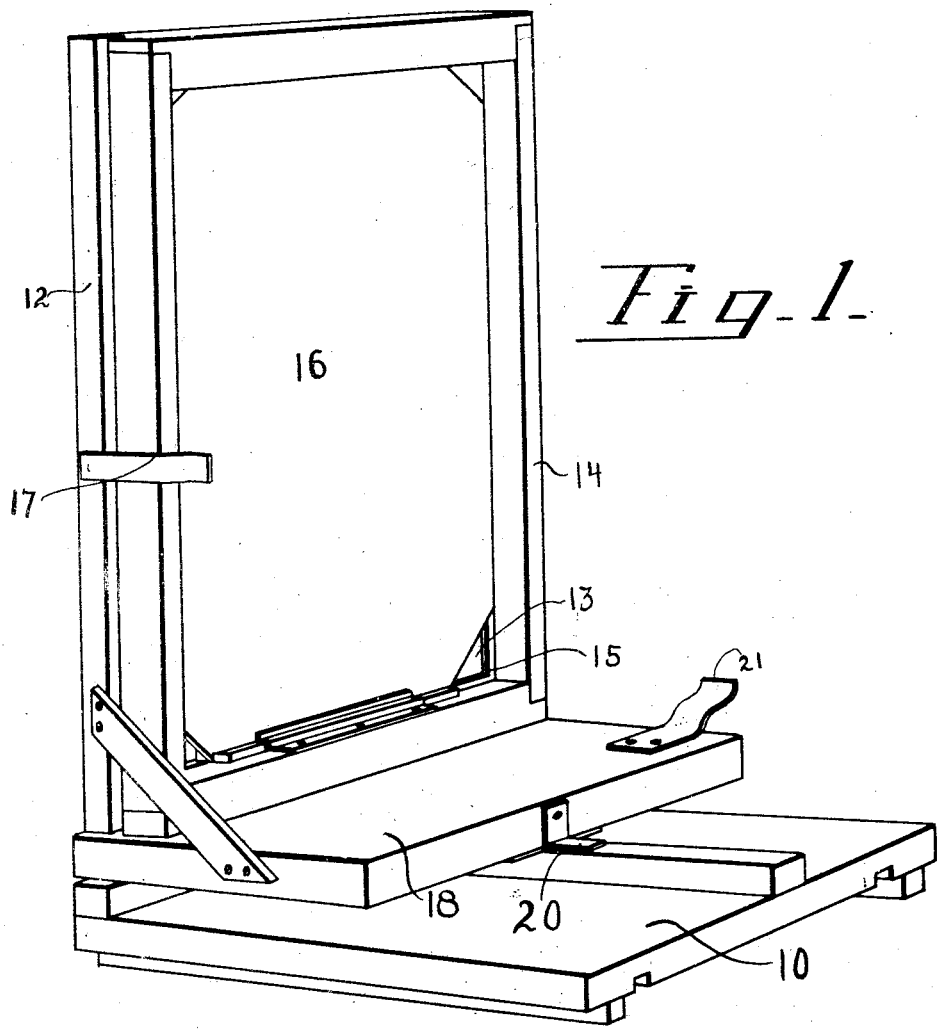
Figure 2:
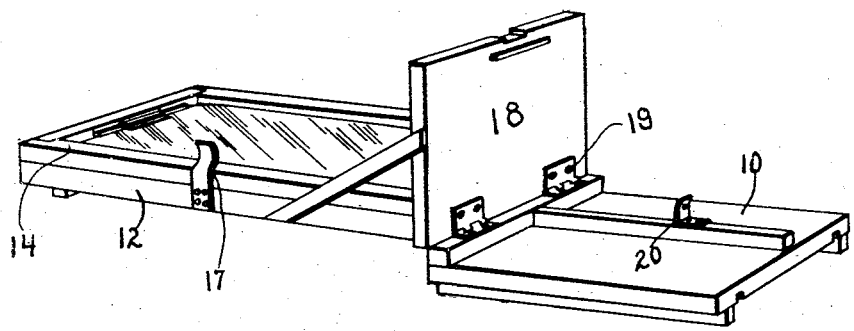
Figure 3:
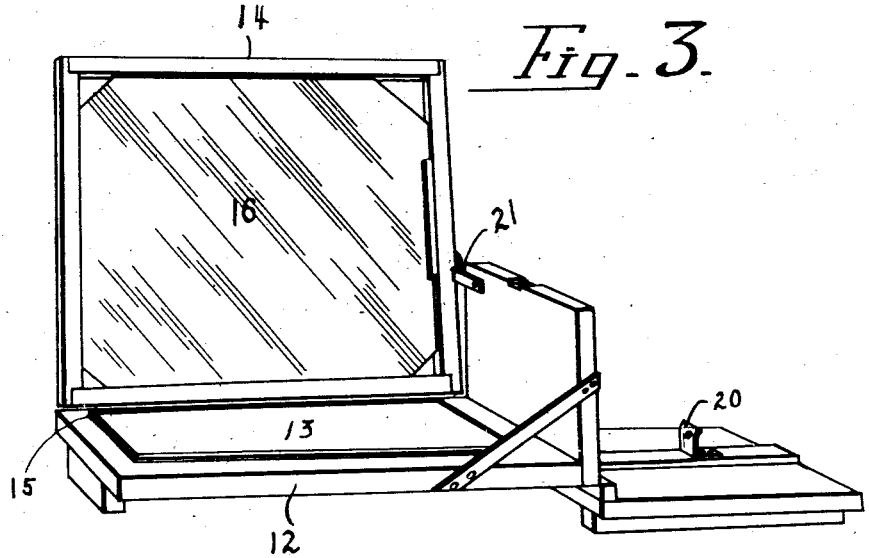

In the accompanying drawings: Figure 1 is a perspective view showing the apparatus with the parts in the focusing and exposing position. Fig. 2 is a similar view showing the exposure frame displaced, as seen when about to introduce or remove the sensitized medium. Fig. 3 is a similar view showing the exposure frame open as when applying or removing the sensitized medium.

Hinged to a base board 10 which is adapted to be arranged on the ordinary running board of a camera (not shown) is an exposure frame 11 which is of sectional construction and comprises a focusing frame 12 provided with ground glass 13, through which when the parts are in the position indicated in Fig. 1, the image may be properly focused and positioned on the exposure surface, and an exposure frame 14 hinged as at 15 to the focusing frame and provided with clear glass 16. The ground glass 13 is preferably arranged in the focusing frame in such a way as to provide a raised bed, and the exposure frame 14 has the clear glass thereof set back from the plane of the inner surface of said frame, while the frame is adapted to snugly fit around said bed 13, whereby when sensitized paper is placed upon the ground glass bed and the exposure frame is closed down, where it is held by the catch 17, the sensitized paper is held in a perfectly flat and satisfactory condition in contact with the clear or exposure glass. This arrangement insures accuracy in the placing of the sensitized paper, without loss of time, and a sheet entirely covering the bed may be employed, or sheets occupying only a portion of the surface of the bed can be readily held in place by the contact of the clear glass of the exposure frame therewith. To insure the positioning of a smaller sheet of sensitized paper, as for example in reductions, etc., the ground glass plate may be marked while focusing so as to indicate just where the sensitized paper should be placed. The return of the exposure frame to its normal position as indicated in Fig. 2 will insure the holding of the paper as positioned.

The exposure frame is provided with a base 18 which is rigid with the focusing frame 12, the two being hinged as at 19 to the base board, and a catch 20 being provided to engage the edge of the base 18 when the focusing frame is in the upright or operative position shown in Fig. 1.

In operation the image is first focused with the parts in the position illustrated in Fig. 1, after which the base 18 of the focusing frame is released from the catch 20 and swung to the horizontal position indicated in Fig. 2, whereupon the exposure frame should be released from the catch 17 and moved to the elevated position indicated in Fig. 3. The exposure frame is held in this position during the manipulation at this point by a catch 21. The sensitized paper or other medium is then placed upon the bed 13, in accordance with the requirements, that is to say, either to cover the entire bed or to occupy a definite position on the surface thereof as may be outlined by pencil markings thereon, and the exposure frame is then folded down to the normal position with reference to the focusing frame and secured by the catch 17, whereupon the focusing frame should be swung to the normal position indicated in Fig. 1 and the exposure made. Obviously to remove the sensitized medium it is only necessary to reverse the above operation.

It will be observed that accuracy in the placement of the sensitized medium is secured and after the focusing operation the operation of the parts to provide for placing of the sensitized medium can be performed rapidly, the sensitized medium definitely secured in position and the parts brought to the exposure position practically without an element of uncertainty in any respect.

What is claimed is:—

The combination with a base board, of a focusing frame hingedly mounted thereon for movement in the vertical plane of exposure, a clear glass exposure frame hingedly mounted upon the focusing frame for swinging movement transversely thereof, and means for securing said parts in their normal relative positions.

In testimony that I claim the foregoing as my own, I have hereto affixed my signature in the presence of two witnesses.

CHARLES H. CARLETON.

Witnesses:
 RENE WHAITE,
 BERTHA L. CARLETON.